United States Patent
Meersschaert (10) Patent No.: US 9,510,654 B2
(45) Date of Patent: Dec. 6, 2016

(54) CONICAL BEARING FOR A WHEEL ASSEMBLY FOR A LUGGAGE ITEM

(71) Applicant: Samsonite IP Holdings S.a r.l., Luxembourg (LU)

(72) Inventor: Reinhard Meersschaert, Merelbeke (BE)

(73) Assignee: Samsonite IP Holdings S.a r.l., Luxembourg (LU)

( * ) Notice: Subject to any disclaimer, the term of this patent is extended or adjusted under 35 U.S.C. 154(b) by 0 days.

(21) Appl. No.: 14/716,376

(22) Filed: May 19, 2015

(65) Prior Publication Data

US 2015/0250276 A1    Sep. 10, 2015

Related U.S. Application Data

(63) Continuation of application No. 14/221,053, filed on Mar. 20, 2014, now Pat. No. 9,060,578.

(30) Foreign Application Priority Data

Mar. 20, 2013   (EP) ..................................... 13160173
Feb. 10, 2014   (EP) ..................................... 14154514

(51) Int. Cl.
   *B60B 33/00*    (2006.01)
   *A45C 5/14*     (2006.01)
   *F16C 19/36*    (2006.01)

(52) U.S. Cl.
   CPC .................. *A45C 5/141* (2013.01); *A45C 5/14* (2013.01); *B60B 33/00* (2013.01);
   (Continued)

(58) Field of Classification Search
   CPC ..... B60B 3/021; B60B 3/023; B60B 3/0049; B60B 3/0055; B60B 3/0057; B60B 3/0071; B60B 3/0073; B60B 3/0076; B60B 3/0026; B60B 3/0065; B60B 3/0068; B60B 2380/00; B60B 2380/14; B60B 2380/16; A62B 3/1492; A62B 5/0083; A45C 5/14
   USPC ........... 16/46, 20–22, 25, 27, 275; 188/1.12; 280/47.38, 642, 647, 650, 651, 654; 384/571, 618, 619; 190/18 A
   See application file for complete search history.

(56) References Cited

U.S. PATENT DOCUMENTS

| 42,338 A | 4/1864 | Beach |
|---|---|---|
| 145,769 A | 12/1873 | Waitt |

(Continued)

FOREIGN PATENT DOCUMENTS

| CN | 201194600 Y | 2/2009 |
|---|---|---|
| CN | 102578778 A | 7/2012 |

(Continued)

OTHER PUBLICATIONS

Extended European Search Report, European Patent Application No. 13160173.4, Sep. 23, 2013, 6 pages.

(Continued)

*Primary Examiner* — Chuck Mah
(74) *Attorney, Agent, or Firm* — Dorsey & Whitney LLP (57) ABSTRACT

A wheel assembly for a luggage item and a luggage item. The wheel assembly may include a housing for operably coupling the wheel assembly to a luggage item. The wheel assembly may also include a wheel support rotatably coupled to the housing and having a first axis of rotation. The wheel support may be coupled to a wheel member having a second axis of rotation. A friction reduction member may be positioned between the housing and the wheel support to facilitate the relative rotation therebetween. The wheel support may include an underside defining in part a conical shape.

19 Claims, 8 Drawing Sheets

(52) U.S. Cl.
CPC ........ *B60B 33/0002* (2013.01); *B60B 33/006* (2013.01); *A45C 2005/148* (2013.01); *B60B 33/0039* (2013.01); *B60B 33/0049* (2013.01); *B60B 33/0057* (2013.01); *B60B 33/0068* (2013.01); *B60B 33/0073* (2013.01); *B60B 2200/45* (2013.01); *B60B 2900/111* (2013.01); *B60B 2900/114* (2013.01); *B60B 2900/321* (2013.01); *F16C 19/361* (2013.01); *Y10T 16/186* (2015.01); *Y10T 16/1847* (2015.01); *Y10T 16/1873* (2015.01); *Y10T 16/19* (2015.01)

(56) References Cited

U.S. PATENT DOCUMENTS

| | | | |
|---|---|---|---|
| 257,834 | A | 5/1882 | Scott et al. |
| 1,576,923 | A | 3/1926 | Malloy |
| 1,582,598 | A | 4/1926 | Hancock |
| 1,645,831 | A | 10/1927 | Tiedemann |
| 1,711,723 | A | 5/1929 | Cousins |
| 1,829,862 | A | 11/1931 | Johnson |
| 1,912,795 | A | 6/1933 | Rice et al. |
| 2,437,588 | A | 3/1948 | Baum |
| 2,500,854 | A | 3/1950 | Mullen et al. |
| 2,521,948 | A | 9/1950 | Rice et al. |
| 2,708,767 | A | 5/1955 | Dean |
| 3,026,558 | A | 3/1962 | Mulholland |
| 3,213,483 | A | 10/1965 | Hayes et al. |
| 3,231,926 | A | 2/1966 | Stollman et al. |
| 4,219,903 | A | 9/1980 | Black |
| 4,566,391 | A | 1/1986 | Haberl et al. |
| 4,669,146 | A | 6/1987 | Saito et al. |
| 4,709,444 | A | 12/1987 | Black |
| 4,720,198 | A | 1/1988 | DeBruyn |
| 5,405,202 | A | 4/1995 | Chi |
| 5,759,097 | A | 6/1998 | Bernoville et al. |
| 6,502,280 | B2 | 1/2003 | Looker |
| 6,698,060 | B1 | 3/2004 | Lee |
| 7,681,702 | B2 | 3/2010 | Miyoshi |
| 8,020,679 | B2 | 9/2011 | Wu |
| 9,060,578 | B2 | 6/2015 | Meersschaert |
| 2006/0156511 | A1 | 7/2006 | Li |
| 2012/0005858 | A1 | 1/2012 | Lai |

FOREIGN PATENT DOCUMENTS

| | | |
|---|---|---|
| DE | 1908480 U | 1/1965 |
| EP | 2781365 A1 | 9/2014 |
| FR | 2813043 A3 | 2/2002 |
| GB | 562665 A | 7/1944 |

OTHER PUBLICATIONS

Extended European Search Report, European Patent Application No. 14154514.5, Aug. 19, 2014, 7 pages.

CONICAL BEARING FOR A WHEEL ASSEMBLY FOR A LUGGAGE ITEM

CROSS-REFERENCE TO RELATED APPLICATIONS

This application is a continuation of co-pending U.S. patent application Ser. No. 14/221,053, filed on Mar. 20, 2014 and entitled "Conical Bearing For a Wheel Assembly For a Luggage Item", which claims priority to European Patent Application No. 14154514.5, filed on Feb. 10, 2014 and entitled "Conical Bearing For a Wheel Assembly For a Luggage Item," which claims priority to European Patent Application No. 13160173.4, filed on Mar. 20, 2013 and entitled "Conical Bearing For a Wheel Assembly For a Luggage Item", which are hereby incorporated in their entireties by reference as though fully disclosed herein.

TECHNOLOGICAL FIELD

The present disclosure generally relates to luggage. More particularly, the present disclosure relates to wheel assemblies for a luggage item.

BACKGROUND

Many luggage items may include wheel assemblies to provide rolling support for the luggage on a support surface. One example of such rolling support includes four spinner wheel assemblies coupled to a bottom of the luggage case. The configuration of four spinner wheels allows a user to roll the luggage laterally in any direction without the need to tip the luggage case onto a pair of wheels. A spinner wheel assembly usually includes a housing for joining the wheel assembly to the luggage case, and a wheel support for rotatably connecting the wheel to a base of the housing so the wheel rotates about a generally vertical axis. To facilitate the rotation of the wheel support relative to the base, the wheel assembly may be configured with bearing structures, such as planar-oriented ball bearing units.

There are several drawbacks with a spinner wheel assembly configured with ball bearing units. Typically, the ball bearing units have a planar orientation, which orientation requires more surface area to create an acceptable load on the ball bearing unit. This results in a larger wheel assembly than is often desired, which impacts the weight and packing space of the luggage case. Also, the ball bearings in the ball bearing units provide only point contacts with the bearing races, which may cause deformation and wear on the upper and lower races. To reduce this wear, the races may be formed by a robust material, such as metal, which is relatively heavy. Non-metal materials may be used, which may be lighter than metal, but sometimes not as strong, and thus requires structural buttressing to resist unwanted deformation. This structural enhancement of non-metallic materials in this use results in relatively thick walls, increasing the overall weight and reducing the weight benefit of non-metal materials. In either case, the races constructed for a ball bearing adds extra weight to the wheel assembly. Another structure that adds extra weight to the wheel assembly in these traditional structures is a central axle, which is usually required for aligning the wheel support with the housing of the wheel assembly along the rotational axis of the wheel support. Accordingly including complex ball bearing units within such spinner structures may be undesirable and in particular for luggage where there is more recently a drive to reduce weight (and also cost), there may be a desire to avoid using such more complex bearing arrangements.

Documents that may be related to the present disclosure in that they include various approaches to wheel construction include U.S. Pat. No. 42,338, U.S. Pat. No. 145,769, U.S. Pat. No. 1,645,831, U.S. Pat. No. 2,437,588, and U.S. Pat. No. 3,231,926. These proposals, however, may not be suitable for use in luggage items, or may be improved.

It is therefore desirable to provide an improved luggage construction, in particular an improved luggage wheel assembly, which addresses the above described problems and/or which more generally offers improvements or an alternative to existing wheel assembly structures and construction methods.

SUMMARY

According to the present invention there is therefore provided a wheel assembly and a luggage item incorporating the wheel assembly as defined in the accompanying claims.

In one example, a wheel assembly for a luggage item may include a housing, a wheel support and a wheel member. The housing may operably couple the wheel assembly to the luggage item. The wheel support may be rotatably coupled to the housing and having a first axis of rotation. The wheel member may be rotatably coupled to the wheel support and having a second axis of rotation. The housing may include a wall defining an upper side and an underside. The wheel support may include a wall defining an upper side and an underside. At least one of the underside of the wall of the housing or the upper side of the wall of the wheel support may define in part a partially conical shape.

In some examples, the housing may include at least two sides each coupled to a different panel of the luggage case.

In some examples, the at least two sides of the housing may include a bottom side coupled to a bottom panel of the luggage case and a vertical side coupled to an adjacent major face panel or an adjacent side panel of the luggage case.

In some examples, the at least two sides of the housing may include a bottom side coupled to a bottom panel of the luggage case and two vertical sides respectively coupled to an adjacent major face panel and an adjacent side panel of the luggage case.

In some examples, the wheel assembly may further include a friction reduction member positioned between the housing and the wheel support.

In some examples, the underside of the wall of the housing may form a first bearing surface movably engaging the friction reduction member. The upper side of the wall of the wheel support may form a second bearing surface movably engaging the friction reduction member.

In some examples, the first and second bearing surfaces may be substantially parallel to each other or oriented at a same angle relative to the first axis of rotation of the wheel support.

In some examples, at least one of the wall forming the first bearing surface or the wall forming the second bearing surface may include a substantially consistent thickness.

In some examples, the friction reduction member may include a plurality of rollers.

In some examples, each of the plurality of rollers may be substantially cylindrical or conical.

In some examples, at least one of the first bearing surface or the second bearing surface may be oriented at an angle between 30 to 50 degrees, preferably between 35 to 45 degrees, more preferably of 40 degrees, with respect to the first axis of rotation of the wheel support.

In some examples, the wheel support may further include a spigot having an axis parallel to the first axis. The spigot may extend from an upper rim of the second bearing surface. The spigot may engage in a bore defined in the housing and located centrally with respect to the first bearing surface.

In some examples, the wheel assembly may further include a securing assembly restricting relative movement between the wheel support and the housing in a direction parallel to the first axis of rotation of the wheel support.

In some examples, the wheel support may include at least one strut for supporting the wheel member at the second axis of rotation of the wheel member.

In some examples, the wheel support may include a pair of struts each formed with at least a contoured inner surface.

In some examples, the pair of struts each may be formed with a contoured outer surface. The contoured inner surface of each of the pair of struts and the corresponding contoured outer surface may be formed with substantially the same curvature.

In some examples, the underside of the wheel support may define in part a partially conical recess.

In some examples, an axis of rotation of each of the rollers of the friction reduction member and the first axis of rotation of the wheel support may define an angle of less than 90 degrees.

In some examples, the axis of rotation of each of the rollers of the friction reduction member and the first axis of rotation of the wheel support may define an angle between 30 to 50 degrees, preferably between 35 to 45 degrees, more preferably of 40 degrees.

In some examples, the friction reduction member may be received in a substantially enclosed space defined by the wheel support and the housing.

In some examples, the friction reduction member may be received in a substantially enclosed space defined by the first and second bearing surfaces.

In some examples, the wheel support may define in part two adjacent conical shapes.

In some examples, at least one of the first bearing surface or the second bearing surface and the friction reduction member form a plastic-on-plastic engagement.

In some examples, the bearing surface for the first axis of rotation may be radially spaced away from the first axis of rotation.

In some examples, the securing assembly may define a C-shaped ring operably received in a groove defined by the wheel support.

In some examples, the wheel assembly may not include a solid centering axle along the first axis of rotation of the wheel support.

In some examples, the friction reduction member may include a cage for receiving the rollers, the cage in supportive contact with the wheel support at an upper end of the cage.

In some examples, the upper end of the cage may include a collar defining an annular shoulder that is adapted to engage a raised ridge portion of an annular ring disposed on the wheel support.

In some examples, the first bearing surface may be curved to form an apex that engages the plurality of rollers between opposing ends of each roller.

In some examples, the apex of the first bearing surface may substantially correspond to a midway point along a length of each roller.

In some examples, a plurality of grooves may be disposed about the circumference of the head portion of the wheel support, the grooves oriented in spaced angular intervals excluding a forward section defined by an angle that is divided by a direction of travel of the wheel assembly, the wheel member trailing the forward section when the wheel assembly is in motion.

In some examples, the angle that defines the forward section may be approximately 30 degrees.

Advantageously, the wheel assembly described herein may reduce deformation and wear of the components of the bearing units (i.e., the friction reduction member and its upper and lower races), improve the rotation/spinning of the wheel support relative to the wheel housing, reduce the weight of the wheel assembly, and allow for a more compact and light weight construction of the wheel assembly. The wheel assembly described herein may also allow for a simplified construction by reducing number and/or size of components used (such as eliminating the need of a central axle, reducing the wall thickness of components) and by reducing number of materials used for construction (such as forming all parts with plastic materials) thereby allowing for simplified material processing handling. A wider configuration for the rollers and bearing surfaces may advantageously improve the stability of the wheel assembly and reduce the forces placed on various components. Supporting the upper end of the bearing cage rather than the lower end may be advantageous because the intrusion of dirt is less likely to cause friction between the bearing cage and the upper and lower bearing surfaces and less likely to cause friction or otherwise inhibit relative movement that may occur between the bearing cage and the wheel support. Concentrating a bearing surface force between the upper and lower ends of the rolling element may be advantageous because the force is distributed more evenly through the body of the rolling element. Groves that provide spacing that enables a lubricating grease to be present between the upper collar and the upper portion of wheel support may advantageously provide a smoother rotatable connection. Omitting grooves in the forward section of the upper portion of the wheel support may advantageously achieve greater efficiency of mechanical energy transfer by increasing the amount of wheel support surface area that contacts the surface area of the upper bore. Reducing an amount of material used may have the advantage of reducing the pre-unit cost of producing the product.

This summary of the disclosure is given to aid understanding, and one of skill in the art will understand that each of the various aspects and features of the disclosure may advantageously be used separately in some instances, or in combination with other aspects and features of the disclosure in other instances.

BRIEF DESCRIPTION OF THE DRAWINGS

The present invention will now be described by way of example only with reference to the following figures in which.

DETAILED DESCRIPTION

Described herein are wheel assemblies, in particular spinner wheel assemblies, for use in luggage items, such as soft side suitcases, hard side suitcases, hybrid suitcases, backpacks, briefcases, computer bags, or any luggage items. Each wheel assembly may include a housing for operably coupling the wheel assembly to a surface of the luggage item, a wheel support, which may be rotatably coupled to the housing, and a wheel member rotatably coupled to the wheel support. The wheel assembly may further include a friction reduction member to facilitate the rotation of the wheel support relative to the wheel housing. The friction reduction member may movably engage the wheel housing at a first bearing surface of the wheel housing. The friction reduction member may movably engage the wheel support at a second bearing surface of the wheel support. Each of the first and second bearing surfaces may define in general a frustoconical shape. The axis of rotation of the wheel support relative to the housing is positioned on the axis of the second bearing surface on the wheel support, which is received in an axle bearing surface centered about the axis of the first bearing surface of the wheel housing. The wheel support may further include an underside surface. The underside surface of the wheel support may define in general an outer wall of a conical recess or a segment of a frustoconical recess, coaxial with the frustoconical shapes defined by the first and second bearing surfaces. The friction reduction member may include one or more rollers. The axis of ration of each roller may converge at the rotational axis of the wheel support. The terms "cone" or "conical" used herein may refer to any body or shape that includes a tapered lateral surface or a segment of a tapered lateral surface. The tapered lateral surface of a conical body or shape may include an upper or lower rim. These bodies or shapes may also be referred to as a frustoconical body or shape.

Figure 1:
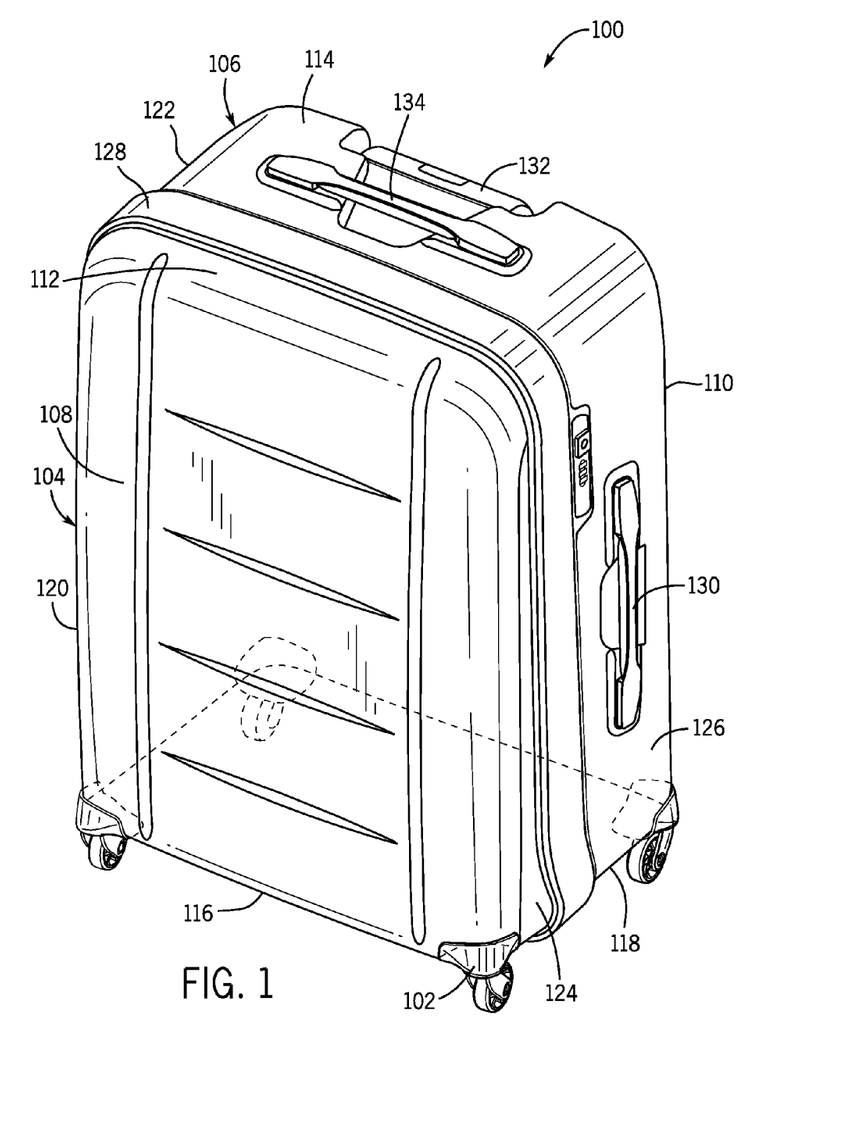
FIG. 1 is a front perspective view of a luggage case incorporating a wheel assembly.

By way of example and without limitations, FIG. 1 shows a luggage case 100 incorporating a wheel assembly 102 according to one example. The luggage case 100 may include opposing housing portions enclosing a compartment. The opposing housing portions used herein may refer to a front portion 104 and a rear portion 106, forming in general a parallelepiped shape defining an interior compartment for receiving items. Each of the opposing portions 104, 106 may include a major face panel 108, 110, a top end panel 112, 114, a bottom end panel 116, 118, a left side panel 120, 122 and a right side panel 124, 126.

The opposing housing portions 104, 106 may be separable in part by a closure mechanism 128, such as a zipper mechanism, while remaining joined together by a hinge that allows the opposing portions to be selectively pivoted relative to each other to open the luggage case 100. The hinge may be formed of a zipper and fabric strip, a piano hinge, discrete hinges spaced apart, an articulating joint of metal, plastic or other suitable material. The hinge may be positioned along one of the end or the side panels. In some examples, the interior compartment of the luggage case 100 may include a single main compartment. In some examples, the interior compartment may be divided into one or more sub-compartments by one or more panels, dividers, zippers, and so forth. The luggage case 100 may further include one or more outer or inner pockets, an insert or tag for identification, luggage locks, and so forth.

The luggage case 100 may include one or more support elements positioned on one or more of its end, side, or face panels. The support elements may include foot support element for supporting the luggage case 100 off of the ground. The support elements may include wheel assemblies for providing rolling support to the luggage case 100 for ease of translation. In some examples, the foot support elements may be configured on the side panels of the opposing portions of the luggage case 100, and a carry handle 130 may be configured on one of the opposing side panels 120, 122, 124, 126 for carrying the luggage case 100. The wheel assemblies, such as four spinner wheels 102, may be configured on the bottom end panels 116, 118 of the opposing portions 104, 106, and a telescoping handle 132 may be configured on one of the top end panels 112, 114, such as the rear top end panel 114, for pushing and/or pulling the luggage case 100. A carry handle 134 may also be positioned on the same top end panel 114 as the telescoping handle 132 or on the other top end panel 112.

In some examples, the bottom end panels 116, 118 may be configured with a combination of foot support elements and wheel assemblies, with one or two foot support elements positioned on the front bottom end panel 116 or the rear bottom end panel 118 and one or two wheel assemblies positioned on the other bottom end panel. However, the configuration of four spinner wheel assemblies 102 may be more preferred by some users since such configuration allows the luggage case 100 to be rolled on its upright position when most of its weight may be supported by the wheel assemblies 102, thus requiring less effort by the user. Further, each of the wheel assemblies 102 may be preferably positioned proximate to a corner region of the luggage case 100 for desired structural integrity and enhanced stability when moving the luggage case 100 on its wheels. The wheel assemblies 102 may be positioned at any suitable location on the bottom end panels for other considerations. Wheel assemblies 102 may also be positioned on one or more of the other panels in addition to or instead of the bottom end panels of the luggage case 100.

In continuing reference to FIG. 1, the luggage case 100 may include four spinner wheel assemblies 102. Two of the four wheel assemblies 102 may be positioned at the front bottom corners of the luggage case 100 and the other two of the four wheel assemblies 102 may be positioned at the rear bottom corners. Each of the front bottom corners may be defined by adjacent front major face panel 108, front bottom panel 116 and one of the front side panels 120, 124. Each of the rear bottom corners may be defined by adjacent rear major face panel 110, rear bottom panel 118 and one of the rear side panels 122, 126.

With reference to FIGS. 1, 2, 3, 4, and 5, each of the wheel assemblies 102 may include a housing 136 for operably coupling the wheel assembly 102 to the luggage case 100, a wheel support 138 rotatably engaging the housing 136, and a wheel member 140 rotatably coupled to the wheel support 138. To facilitate the rotation of the wheel support 138 relative to the housing 136, the wheel assembly 102 may also include a friction reduction member 142 (e.g., FIG. 3) positioned between respective bearing surfaces of the housing 136 and the wheel support 138. As described in more detail below, one unique aspect of the wheel assemblies 102 as described herein is that the surface of the housing 136 that engages the friction reduction member 142 and the surface of the wheel support 138 that engages the friction reduction member 142 may be oriented at an angle with respect to the luggage panel to which the wheel assembly 102 may be coupled. More specifically, the respective bearing surfaces may define in general conical or frustoconical shapes with the axes of rotation of the wheel support 138 relative to the housing 136 as their common axes.

Figure 2:
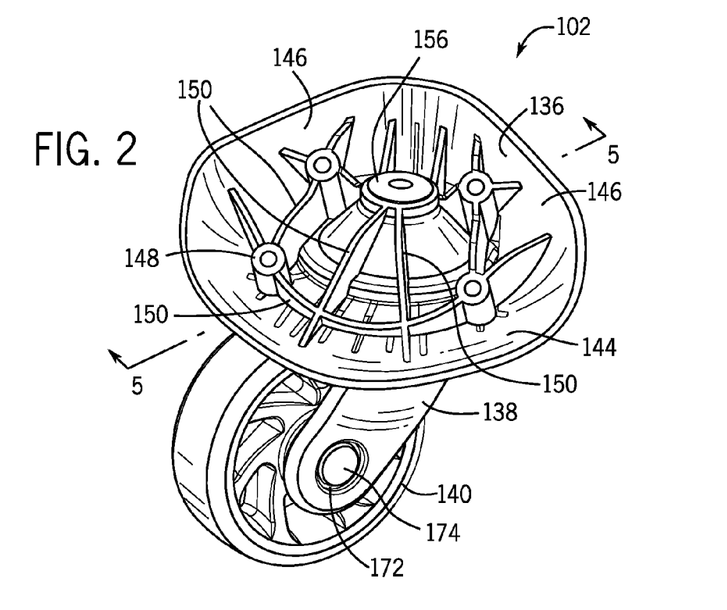
FIG. 2 is a top perspective view of a wheel assembly that may be used for the luggage case of FIG. 1.
Figure 4:
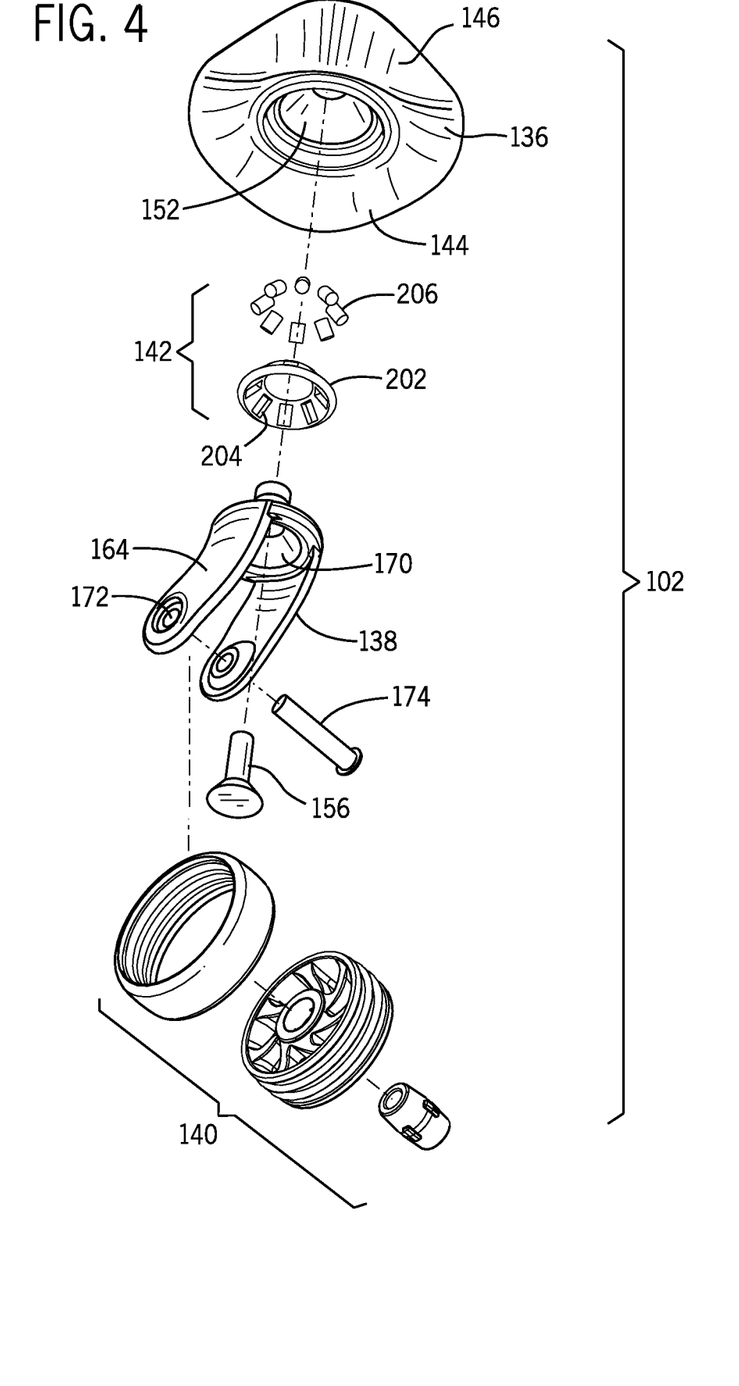
FIG. 4 is an exploded bottom perspective view of the wheel assembly of FIG. 2.
Figure 5:
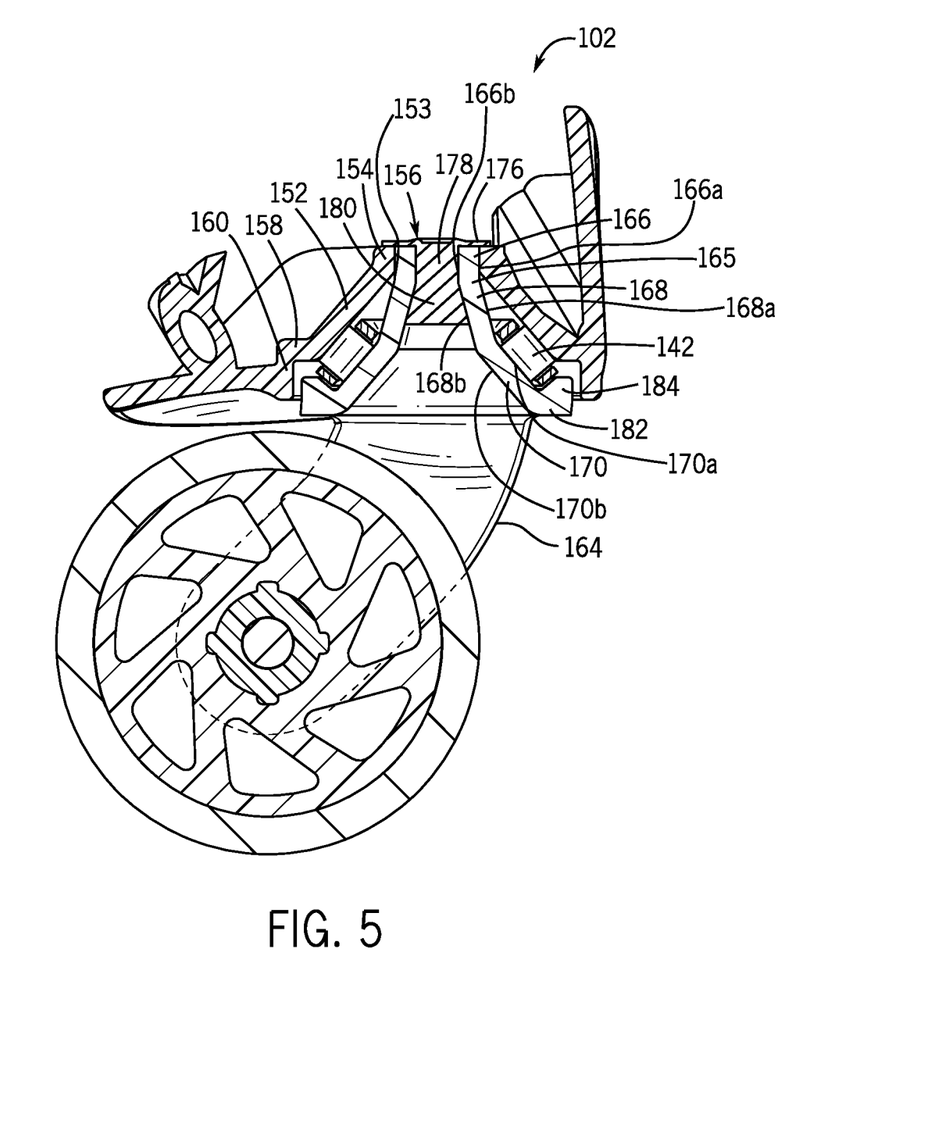
FIG. 5 is a cross section view of the wheel assembly of FIG. 2, viewed along line 5-5 in FIG. 2.

With respect to the FIGS. 2, 4, and 5, the housing 136 may include a base 144 and one or more sides 146 that extend at approximately right angles from the base 144. The base 144 may also be referred to as the bottom side 144 of the housing 136, and the one or more sides 146 extending at approximately right angles from the base 144 may also be referred to as the one or more vertical sides 146 of the housing 136. The base 144 and the one or more sides 146 may collectively define an exterior surface forming corner portions of the exterior surface of the luggage case 100. Specifically, the base 144 may be coupled to the bottom end panel 116, 118, and the exterior of the base 144 may form a corner portion of the exterior surface of the bottom end panel 116, 118 of the luggage case 100. Each of the one or more sides 146 may be coupled to the adjacent front, rear, or side panel 108, 110, 120, 122, 124, 126 of the luggage case 100.

The base 144 and the one or more sides 146 may collectively define an interior surface of the housing 136 facing toward the interior compartment of the luggage case 100. The interior surface may include structures formed thereon for coupling the housing 136 to the luggage case 100. Specifically, the housing 136 may include one or more bosses 148 for receiving the fasteners for joining the housing 136 to the luggage case 100. In some examples, the housing 136 may further include support ribs 150 selectively formed on the interior surface of the housing 136 to provide structural support to the fastener receiving structures 148 and the sides 146 of the housing 136.

With further reference to FIGS. 4 and 5, the base 144 of the housing 136 may include a wall having an annular angled portion 152, which defines a conical or frustoconical shape configured to receive at least a portion of the wheel support 138 and the friction reduction member 142. At least a portion of the underside of the angled wall portion is a bearing surface that supports or forms contact with the friction reduction member 142 and/or the wheel support 138 (as described below). The underside surface of the angled wall portion 152 may define in general a segment of a conical or frustoconical recess, the main axis of which may align with the rotational axis of the wheel support 138 with respect to the housing 136.

In continuing reference to FIG. 5, the angled wall portion 152 of the housing 136, and in particular that portion forming the bearing surface, may have a substantially consistent thickness over a majority of its area, defined by the distance between the underside or exterior surface and an upper side or interior surface of the base 144 of the housing 136. A suitable thickness dimension may be 1.5 mm to 3.5 mm, preferably 2.5 mm. In some examples, the angled wall portion 152 may have a varying thickness. The top end of the angled wall portion 152 may define an upper bore 153 of the housing 136 for receiving an upper end of the wheel support 138. The upper bore 153 may be coaxial with the conical shape of the angled wall portion 152 of the housing 136 referenced above. In some examples, the upper bore 153 of the housing 136 may be defined by an inner surface of an upper collar 154 formed at or near a top end of the angled wall 152, and extending upwardly from the upper rim of the angled wall portion 152. The upper collar may have a consistent wall thickness, which may be the same as, less than, or greater than, the wall thickness of the angled wall. In one example, the upper collar 154 may have a cylindrical shape, or may have tapered sidewalls forming a frustoconical shape. The upper collar 154 may define a substantially horizontal upper surface, a substantially vertical inner surface and a substantially vertical outer surface. In some examples, the upper collar 154 may be relatively short and may not include the substantially vertical outer surface. The substantially vertical inner surface of the upper collar 154 acts as an axle bearing surface and receives a portion of the wheel support 138 to allow the wheel support 138 to rotate with respect to the housing 136. The substantially horizontal upper surface of the upper collar 154 may support a rivet 156 thereon as part of a securing mechanism for securing the wheel support 138 to the housing 136 (as described below).

An annular flange 158 is formed at a lower end or edge of the angled wall portion 152, and extends laterally from the lower edge thereof. An annular lower collar 160 extends downwardly from the flange 158 and defines the outer edge of the flange 158. In one example, the annular lower collar 160 may define a cylindrical shape, or may form a frustoconical shape. The flange 158 and the lower collar 160 may serve as a baffle that may deflect dust from entering the conical or frustoconical recess of the housing 136.

With reference to FIGS. 3, 4, 5, 6A, 6B, and 6C, the wheel support 138 may include an upper portion, such as a head 162, for rotatably coupling with the housing 136 and a lower portion, having one or more struts 164, for rotatably coupling with the wheel member 140. The head 162 may include a wall defining a conical lower section 170 and a spigot 165 connected to the conical lower section 170 and extending from the upper rim of the conical lower section 170. At least a portion of the outer surface 170a of the lower section 170 is a bearing surface that supports or forms a contact surface with the friction reduction member 142 and/or the wheel housing 136. The spigot 165 may rotatingly engage in the bore 153 defined by the housing 136 as referenced above. In some examples, the spigot 165 may include two sections: a cylindrical upper section 166 and a conical middle section 168 connecting the cylindrical upper section 166 to the conical lower section 170. Each section 166, 168, 170 of the wall includes an outer surface 166a, 168a, 170a and an inner surface 166b, 168b, 170b. The inner surface of the upper section 166 of the wall may define an internal cavity of the upper section 166, which in one example may be cylindrical. The inner surface of the middle section 168 of the wall may define a conical or frustoconical internal cavity of the middle section 168. The inner surface of the lower section 170 of the wall may define a conical or frustoconical internal cavity of the lower section 170. The cavities individually or considered together are considered to create a concave cavity opening downwardly. The respective outer and inner surfaces of each section 166, 168, 170 may be substantially parallel to each other, thus define a substantially consistent thickness for that section of the wall. A suitable thickness dimension may range substantially between 1.5 mm to 3.5 mm, with 2.5 mm having been found beneficial. Other wall thicknesses, either thinner or more thick, are contemplated. In some examples, the respective outer and inner surfaces of each section 166, 168, 170 may not be parallel to each other. Each section of the wall may have a varying thickness. The head 162 as a whole, and also each section 166, 168, 170 individually, may be coaxial with the conical shape of the angled wall portion 152 of the housing 136 referenced above.

In some examples, the bearing surface defined by the underside of the angled wall portion 152 of the housing 136 and the bearing surface defined by the outer surface of the lower section 170 of the wheel support 138 may be substantially parallel to each other or oriented at the same angle relative to the rotational axis of the wheel support 138. In some examples, the bearing surfaces may be oriented at different angles relative to the rotational axis. Each of the bearing surfaces may be oriented with respect to the rotational axis of the wheel support 138 at an angle between 30 to 50 degrees, such as 35, 40, or 45 degrees, or any suitable angle of degrees. In some examples, the bearing surfaces may be spaced apart by a friction reduction member received therebetween. In some examples, the bearing surfaces may form direct contact with each other.

The one or more struts 164 may extend downward from the conical lower section 170 of the head 162. Each of the one or more struts 164 may be configured with a transverse opening or a recess 172 formed at a lower end for supporting a central axle 174 of the wheel member 140. The central axle 174 of the wheel member 140 defines an axis of rotation of the wheel member 140.

With reference to FIG. 5, the spigot 165, more specifically, the upper section 166 of the spigot 165 of the head 162 may be received within the bore 153 defined by the upper collar 154 of the housing 136. The upper surface of the upper section 166 may be flush with the upper surface of the upper collar 154. The cylindrical upper section 166 may define a substantially vertical outer surface that may rotatingly contact the substantially vertical inner surface of the upper collar 154 of the housing 136. The spigot 165 of the head 162 and the upper collar 154 of the housing may form part of a securing assembly for securing the wheel support 138 to the housing 136. The securing assembly may further include a rivet 156. The rivet 156 may include a frustoconical lower body 180, a shaft 178 and a terminal end 176. The rivet 156 may be inserted from the bottom of the bore or the central cavity so the frustoconical lower body 180 seats against the inner sidewall of the spigot 165 and the shaft extends through the bore. The terminal end 176 passes above the upper surface of the upper collar 154 of the housing 136 and the upper surface of the upper section 166 of the wheel support 138. The terminal end 176 is deformed against the upper surface of the upper collar 154 and the upper surface of the upper section 166 (with or without a washer positioned therebetween) to secure the housing 136 and the wheel support 138 rotatably together.

Another example of a securing assembly may be utilized. For example, where the upper surface of the cylindrical upper section 166 may extend above the upper surface of the upper collar 154. An annular groove may be formed in the outer surface of the cylindrical upper section 166 of the wheel support 138 for receiving a C-shaped retainer ring member. The C-shape ring member may be formed with a width greater than the depth of the groove. As such, the C-shape ring member may protrude outwardly from the outer surface of the cylindrical upper section 166 and may engage the upper surface of the upper collar 154 of the housing 136. This retention structure secures the wheel support 138 in the housing 136, and prevents the wheel support 138 from disengaging from the housing 136 under normal use conditions. In some examples, a washer may be positioned between the C-shaped ring member and the upper surface of the upper collar 154 of the housing 136 to reduce wear on the top of the upper collar 154. The C-shaped ring member may be formed of a material that can experience some elastic deformation.

In some examples, the wheel housing 136 and the wheel support 138 may each include a lower lip formed below their respective bearing surfaces for the friction reduction member 142. The lower lip of the housing 136 may close around the lower lip of the wheel support 138 for retaining the upper portion of the wheel support 138 inside the conical recess of the wheel housing 136. In some examples, a ridge may be formed on stub of wheel support 138 that is snap fit into the bore 153 in the housing 136 and then rests on the upper rim of the housing 136.

Figure 3:
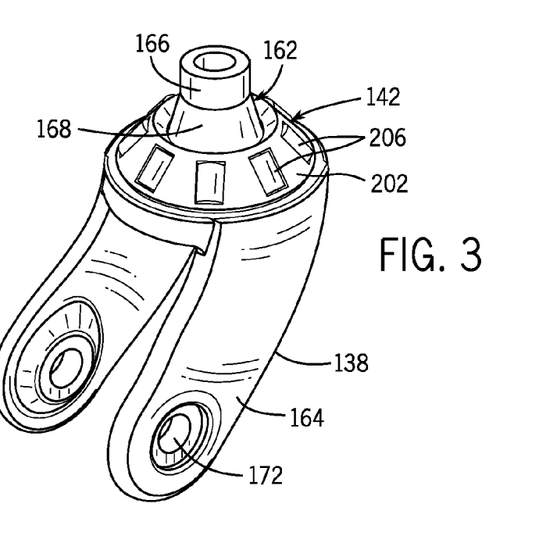
FIG. 3 is another top perspective view of the wheel assembly of FIG. 2, with the wheel base and the wheel removed.

With reference to FIGS. 3 and 5, the conical lower section 170 may bear or support the rolling elements of the friction reduction member 142, or in this example the rollers. The angled wall portion 152 of the housing 136 and the conical lower section 170 of the wheel support 138 may effectively serve as the respective upper and lower races for the rollers. The conical lower section may further include an annular flange formed at a lower end or edge of the conical lower section and extending laterally from the lower edge. The annular flange may further prevent dust from entering into the space receiving the friction reduction member 142 to cause rotation friction. An annular lip 184 may extend upwardly from an upper surface of the flange 182. The annular lip 184 may include a side surface oriented at an angle with the outer surface of the lower section 170 for supporting a lower end of the friction reduction member 142 (as described below). The side surface of the annular lip 184 supporting the friction reduction member 142 may form a frustoconical shape.

Similar to the angled wall portion 152 of the housing 136, the conical lower section 170 may include a substantially consistent wall thickness given the inherently strong structure provided by the conical shape. Varying wall thickness may be employed for other considerations, but would result in an increase in weight for compared to a consistent wall thickness of the same material. The conical middle section 168 that joins the cylindrical upper section 166 and the conical lower section 170, and may improve the structural strength of the wheel support 138. In some examples, the conical middle section 168 may be omitted to accommodate size restrictions or other purposes.

With reference to FIGS. 3, 4, and 5, the friction reduction member 142 is positioned within a substantially enclosed space defined by the angled wall portion 152 of the housing 136 and the conical head 162 portion of the wheel support 138. The friction reduction member 142 may include a bearing cage 202 having a conical shape complementary to the shape of the angled wall portion 152 of the housing 136 and the conical head 162 portion of the wheel support 138. Apertures 204 are formed in a spaced-apart configuration around the bearing cage 202, which each receive a rolling element. The rolling elements may be configured as ball bearings or rollers 206. Rollers may be advantageous in some examples, because rollers provide line contact with the bearing surfaces as opposed to point contact provided by balls. Line contact provided by rollers 206 reduces load and wear on bearing surfaces. Each of the rollers 206 may be substantially cylindrical or slightly tapered. Cylindrical or substantially cylindrical rollers 206 may substantially reduce the rotational resistance between the wheel support 138 and the wheel housing 136. Slightly tapered rollers 206 may further reduce rotational resistance.

The rollers 206 may be configured with a diameter greater than the thickness of the bearing cage 202. When the wheel support 138 rotates relative to the housing 136, the rollers 206 may form contact with and provide rolling support to the housing 136 and the wheel support 138 thereby reducing the rotational resistance between the two. The bearing cage 202 may contact one of the housing 136 or the wheel support 138 and support the rollers 206 in their relative positions with each other. Although a bearing cage 202 is described herein as an example, other supporting structures, such as a bracket, may be utilized.

The friction reduction member 142 is placed over and supported by the lower conical section 170 of the wheel support 138 (as described above). The axis of rotation of each roller 206 may extend toward the axis of the frustoconical angled wall 152 of the housing 136. In some examples, the axis of rotation of each roller 206 may extend toward the apex of the cone defined by the recess of the housing 136. The axis of rotation of the rollers 206 and the axis of rotation of the wheel support 138 relative to the wheel housing 136 may define an angle of less than 90 degrees. In some examples, the axis of rotation of the rollers 206 and the axis of rotation of the wheel support 138 may define an angle between 30 to 50 degrees, such as 35, 40, or 45 degrees, or any suitable angle of degrees, depending on the structure and strength of the wheel housing 136, wheel support 138, materials used and so on.

In one example the angle of 40 degrees was found to be beneficial for creating a desirable bearing load, both laterally and axially, between the housing 136 and the wheel support 138. In one example, at 40 degrees, there is a remaining upward force during use in the area of the securing (and thus on the bearing structure between the housing 136 and the wheel support 138). Thus in normal spinning motion during use (e.g. the wheel support 138 rotates around the first axis of rotation), there is little or no force on the securing structure, which further lessens the friction at that bearing location. It is noted that making the angle larger than that noted above would increase the outward forces on the housing 136, and during a vertical drop onto the wheel assemblies 102 the housing 136 may be damaged. Reducing the angle below that noted above would cause an increase on the pull forces on the retainer.

There are many advantages associated with the frustoconical bearing structure formed between the housing and the wheel support. The enhanced bearing performance and strength of the structural configuration allows the wall thicknesses to be reduced and fewer bracing structures to be used in the forming of the wheel assembly. The conical-shaped angled wall of the housing and the cone shaped head portion of the wheel support, both at least in part forming the bearing surface, is an strong structural shape, and allows the load of the luggage to be distributed or transferred at an angle to wheel support. This reduces the load born by the lower bearing surface (i.e., the conical lower section 170 of the head 162) of the wheel support. The reduced load on the strong structure allows the wall thickness to be reduced, and made a substantially constant thickness, which reduces the weight of the structure. In addition, changing the direction of the loading also results in the vertical load being transferred into a part horizontal component within the housing and wheel supports such that some of the load is distributed horizontally, and also such that some of this load is carried by tension within the plastic housing material better distributing the loading stresses within the housing. As a result load distribution can be more optimized and less material can be used to carry the same loads. The central portion of the head of the wheel support is then formed as a frustoconical recess defined by the wall forming the lower bearing surface. This hollow central area which helps to further reduce the weight of the wheel assembly. Reduced load on the bearing surfaces, in particular due to the use of rollers providing a line contact, rather than ball bearings providing a point contact, also leads to reduced wear, reduced loading and less strengthening reinforcement of the bearing surfaces (such as the support ribs 150 formed on the upper surface of the angled wall portion 152 of the housing 136 defining the upper bearing surface) needed and reduced resistance against rotation of the wheel support relative to the housing.

In addition, the coaxially shaped conical bearing surfaces of the wheel housing 136 and the wheel support may eliminate the need of a centering axle or rivet, which is usually constructed with steel or aluminum. By using a plastic material for construction, forming bearing surfaces with a reduced thickness, and eliminating the need of the centering axle or rivets, the weight of the wheel assembly may be reduced.

Additionally, a relatively large portion of the surface area of a central swivel axle of a traditional wheel assembly may form contact with the wheel support, and create horizontal and vertical friction areas, thus increasing the resistance to the rotation of the wheel support. In contrast, the wheel assembly as described herein may only form friction area where the upper collar of the angled wall portion of the housing contacts the cylindrical upper section of the head of the wheel support. However, the surfaces forming the contact there between are relatively small, close to the rotation axis of the wheel support, and define a plastic-on-plastic interface, thus leading to a very low resistance to the rotation of the wheel support.

Another advantage of the wheel assembly described herein as compared to a wheel assembly with a central swivel axle is that the angled bearing surfaces of the present disclosure may allow the overall height of the wheel assembly to be lower than the wheel assembly with horizontal bearing surfaces and a central vertical swivel axle.

Moreover, because the friction reduction member of the wheel assembly described herein may be received or substantially enclosed in a space defined by the conical recess of the housing and the conical head portion of the wheel support, dust may not accumulate between the bearing surfaces of the wheel housing and the wheel support and the rollers of the friction reduction member. This is in contrast to a spinner wheel assembly with a central swivel axle configuration, at least a lower end of which is usually exposed to the environment. Such exposure may lead to corrosion or degradation of the central axle. Dust may also accumulate around the central resulting in an increased rotational resistance.

Also, a roller bearing structure disperses the load of the luggage case over more surface than a ball bearing structure. A line contact is formed along opposing sides of each roller and the upper race (i.e., the angled wall portion 152 of the wheel housing 136) and the lower race (i.e., the lower conical section of head 162 of the wheel support 138). Such line contact, as opposed to point contact formed by traditional ball bearings, may reduce wear. Further, the rollers may be formed of a plastic material instead of steel for traditional ball bearings. The plastic-on-plastic contact or engagement between the rollers and its upper and lower races may further reduce wear of components of the bearing units.

Figure 6A:
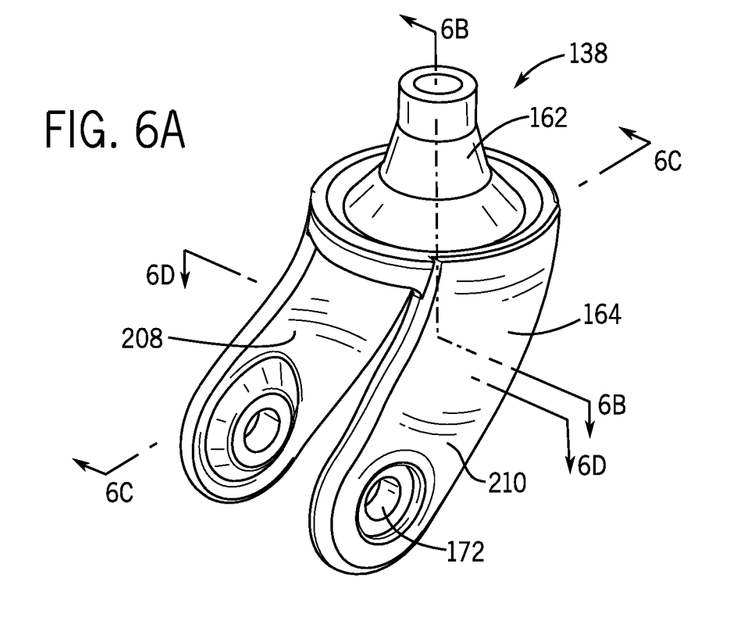
FIG. 6A is a top perspective view of a wheel fork of the wheel assembly of FIG. 2.
Figure 6B:
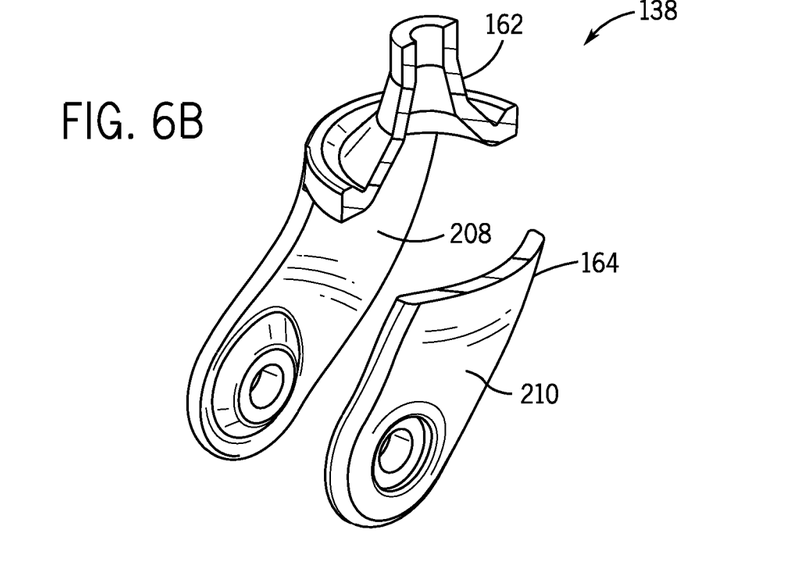
FIG. 6B is a cross section view of the wheel fork of FIG. 6A, viewed along line 6B-6B of FIG. 6A.
Figure 6C:
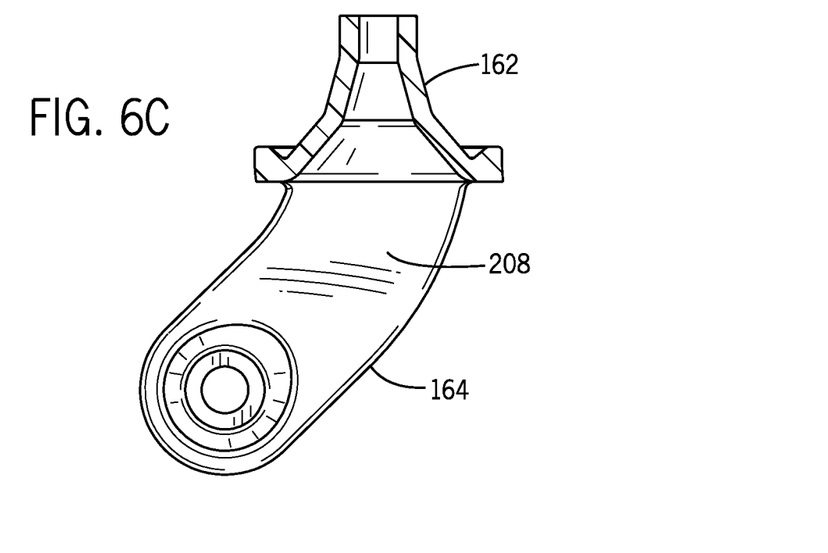
FIG. 6C is another cross section view of the wheel fork of FIG. 6A, viewed along line 6C-6C of FIG. 6A.

With reference to FIGS. 6A, 6B, 6C, and 6D, two struts 164 of the wheel support 138 may extend downwardly from the lower rim of the head 162 of the wheel support 138, and curve away from the axis of rotation of the wheel support 138 relative to the housing 136 (e.g. FIG. 6C). The struts 164 define an aperture 172 adjacent to a lower end of each strut 164 for coupling with a central axle 174 for rotatably supporting a wheel member 140 between the struts 164.

Figure 6D:
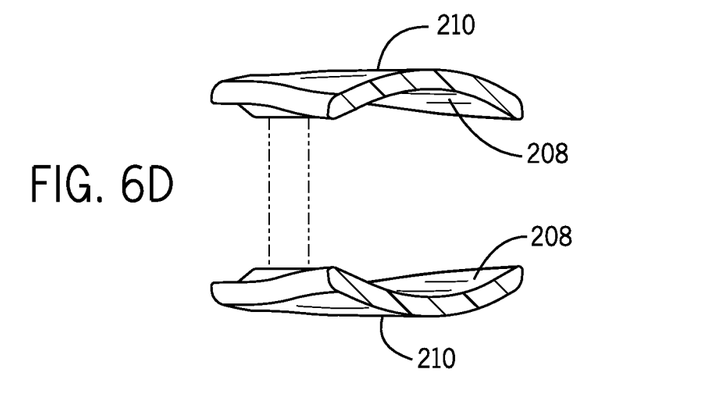
FIG. 6D is another cross section view of the wheel fork of FIG. 6A, viewed along line 6D-6D of FIG. 6A.

Each strut 164 may be formed of a contoured member having a relatively thin cross section, and having a concave contoured inner surface 208 facing the wheel member 140 and a convex contoured outer surface 210 facing away from the wheel member 140. The concave and convex curved surfaces 208, 210 of the struts 164 extend generally laterally relative to the extension of the strut 164, or in other words the curvature of the surfaces 208, 210 extends generally parallel to the floor. This is in contrast with conventionally constructed wheel supports where the inner surface is usually not concave contoured, which results in a thicker center section. As best shown in FIG. 6D, the inner surface 208 of the strut 164 of the wheel assemblies 102 as described herein may be curved in the same direction as the outer surface 210 of the strut 164 to create a substantially consistent wall thickness. In some examples, the inner surface 208 of the strut 164 may closely follow the curvature of the outer surface 210 of the strut 210. Accordingly, each strut 164 may be formed with substantially an even thickness, as delineated by the inner and outer surfaces 208, 210 of the strut 164. A suitable thickness dimension may be generally substantially 2 mm to 4 mm, with 2.5 mm having been found to be beneficial. Other thicknesses are contemplated based on performance characteristics of the material used. Forming the struts 164 with curved surfaces 208, 210 may make the struts more flexible and as such absorb shocks when the luggage drops.

Each strut 164 additionally curves away from the axis as it extends downwardly from the head 162 of the wheel support 138, providing further structural integrity and strength to each of the struts 164. These combined curved surfaces of each strut 164 form a structure having significant strength, allowing the wall thickness to be reduced according to the material properties of the construction material. This reduction in wall thickness provides additional savings to the weight of the spinner wheel assembly 102 overall. In some instances, a weight reduction for one example has been found to be in the range of at least 10% and up to 70%. In addition, configuring the inner surface and the outer surfaces of each strut 164 to be positioned with the concave inner surfaces opposing one another increases the strength of the strut as compared with a strut with one or both inner and outer surfaces to be flat, non-contoured surfaces.

Although two downwardly extending struts 164 are shown with a central axle 174 positioned therebetween for rotatably supporting a wheel member 140, it is contemplated that the wheel support 138 may include only one downward extending strut. The only one downward extending strut may support an axle for a wheel positioned on either side thereof.

Other configurations of the friction reduction member 142 may be contemplated. In some examples, the friction reduction member 142 may not include rollers 206. The friction reduction member 142 may be a low-friction surface bearing, such as a Teflon disc, with a conical shape coaxial with the first bearing surface of the housing 136 and the second bearing surface of the conical head 162 of the wheel support 138. In some examples, the wheel assembly 102 may not include a separate friction reduction member 142 because the conical shaped bearing surfaces may be made of or coated with a material that, in direct engagement, offers improved load distribution and, at least to certain extent, reduce rotation resistance for the wheel assembly 102. One such suitable material to reduce or eliminate the need for a separate friction reduction member 142 is UHMW polyethylene. The housing 136 and the wheel support 138, or at least the respective conical bearing surfaces, may be formed with or coated with low-friction materials to facilitate the relative rotation of the two. Thus, the friction reduction member may include a separate member (e.g. rollers or balls as noted above or a low friction surface bearing element); or attached to or mounted on the respective bearing surfaces (e.g. surface treatments applied to the respective bearing surfaces of the housing and wheel support); or integral with the bearing surfaces (e.g. the material itself used to forming the respective housing and wheel support bearing surfaces).

Figure 7:
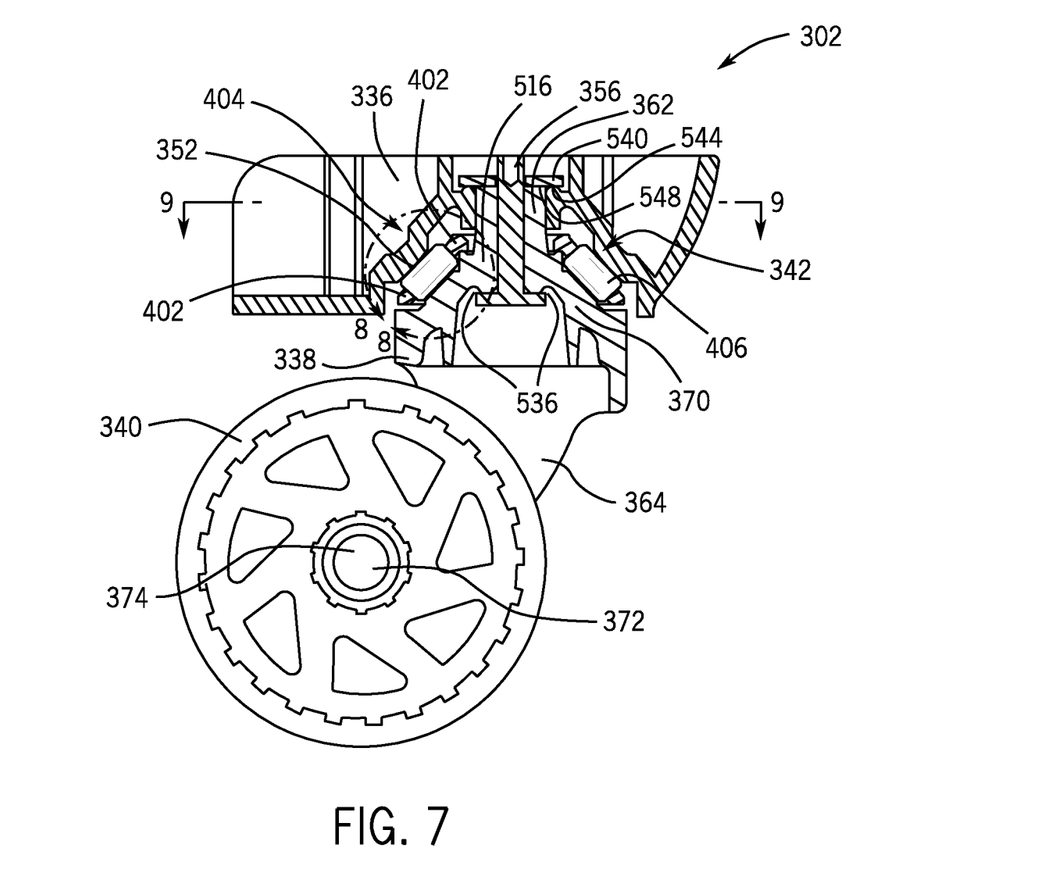
FIG. 7 is a cross section view of a wheel assembly that includes alternative configurations for various components.
Figure 8:
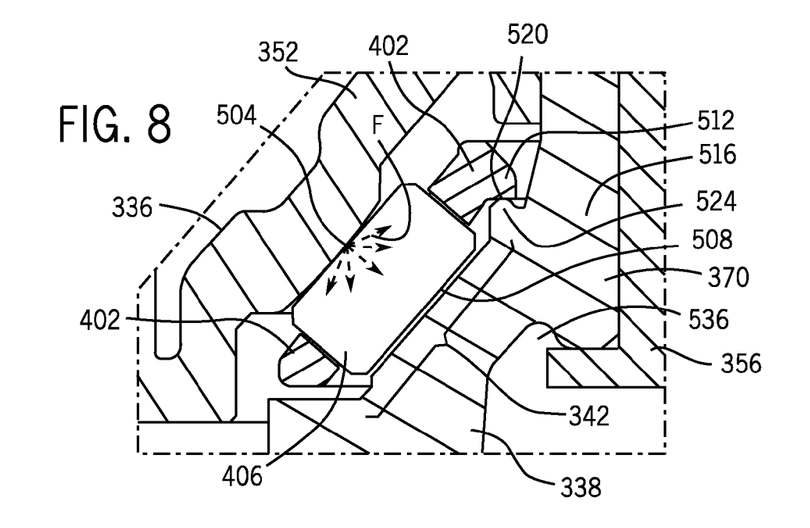
FIG. 8 is a close-up illustration of the friction enhancing member shown in section 8-8 of FIG. 7
Figure 9:
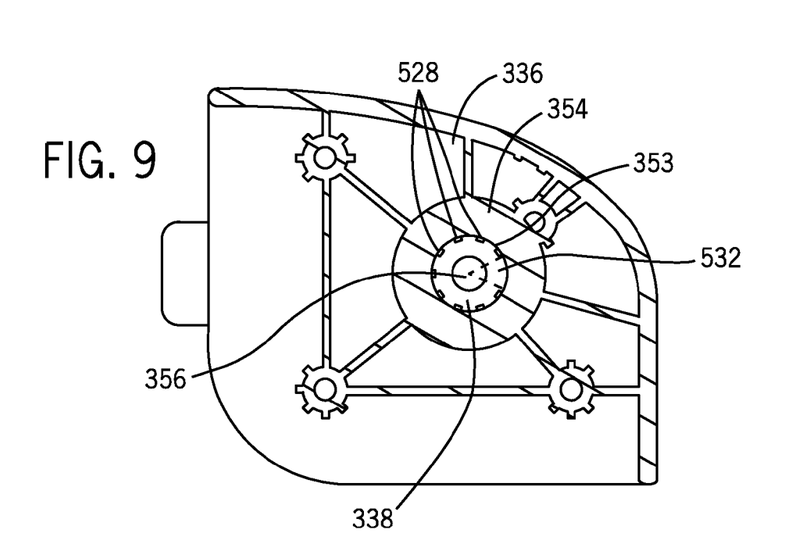
FIG. 9 is a cross section view of the wheel assembly of FIG. 7, viewed along line 9-9 in FIG. 7.

FIGS. 7, 8 and 9 illustrate an example wheel assembly 302 including an alternative configuration for certain components, such as the friction reduction member. Like the wheel assembly 102 shown in FIGS. 1-6, the wheel assembly 302 contains a housing 336 for operably coupling to a luggage case 100. The wheel assembly 302 includes a wheel support 338 having a conical head 362 that rotatably attaches to the housing 336 through a pivot axle or rivet 356. Struts 364 depend from the head 362 and define corresponding apertures 372 that receive a central axle 374 for rotatably supporting a wheel member 340 between the struts 364. The friction reduction member 342 is seated between an angled wall portion 352 of the housing 336 and the lower section 370 of the wheel support head 362 to facilitate the rotation about a vertical axis of the wheel support member 338 relative to the housing 336. As described above, the friction reduction member 342 is part of an advantageous frustoconical bearing structure formed by the angled orientation of upper 504 and lower 508 bearing surfaces associated with, respectively, the housing 336 and wheel support 338 so as to provide the upper and lower races for the rolling elements 406 of the friction reduction member 342. The alternative configuration of the friction reduction member 342 shown in FIGS. 7, 8 and 9 includes an alternative positioning for the rolling elements 406 relative to the height of the pivot axle 356, an alternative cage structure for positioning the bearings between the races 504 and 508, as well as an alternative configuration for the engagement between the rolling elements 406 and the upper bearing surface 504.

The alternative structure shown in FIG. 7 includes an alternative positioning for the rolling elements 406 relative to the height of the pivot axle 356. As can be seen in FIG. 7, the rolling elements 406 are disposed at a greater distance from the pivot axle 356 in comparison to rolling elements 206 of the structure shown in FIGS. 1-6. More specifically, the rolling elements 406 are located farther down the diagonal slope of the bearing surfaces 504 and 508 so as to be farther away from the rivet 356 that attaches the wheel support 338 to the housing 336. The bearing surfaces 504 and 508 are also wider. This location and configuration for the rolling elements 406 and bearing surfaces advantageously improves the stability of the wheel assembly 302 and reduces the forces placed on the various components.

Turning now to the alternative cage structure for positioning the bearings between the races 504 and 508, reference is made to FIGS. 7 and 8. As described above in connection with similar structure, the friction reduction member 342 may include a conical shaped bearing cage 402 having a plurality of apertures 404, each aperture for receiving a corresponding rolling element 406. The cage 402 maintains the rolling elements 406 in a spaced-apart configuration. As shown in FIGS. 7 and 8, the upper end of the bearing cage 402 may include a collar defining an annular shoulder 512 that is adapted to engage an annular ring 516 portion of the wheel support 338. Shoulder 512 has a downwardly facing engagement surface 520 that extends radially inwardly. The annular ring 516 defines a raised ridge portion 524 located proximate to the outermost diameter of the annular ring 516. The ridge portion 524 contacts and forms a bearing surface for the engagement surface 520 of the annular shoulder 512 to allow relative rotation of the two around the axis of the rivet 356.

The bearing cage 402 hangs or is suspended from the raised ridge 524 portion of the wheel support 338 to position the roller bearings 406 in the space between the upper bearing surface 504 associated with the housing 336 and the lower bearing surface 508 associated with the wheel support 338. More specifically, the contact between the annular shoulder 512 and the raised ridge 524 inhibits the movement of the bearing cage 402 further down into the space between the bearing surfaces 504, 508 that would otherwise occur due to the force of gravity. Thus, the configuration shown in FIGS. 7 and 8 may omit the annular lip 184 that supports the lower end of the bearing cage in the configuration shown in FIGS. 1-6. In one respect, supporting the upper end of the bearing cage 402 rather than the lower end is advantageous because the intrusion of dirt is less likely to cause friction between the bearing cage 402 and the upper and lower bearing surfaces 504 and 508 because dirt cannot build-up and accumulate on the inside of the annular lip 184. Additionally, with the point of contact between the bearing cage 402 and the wheel support 338 removed from that portion of the space between the upper and lower bearing surfaces 504 and 508 that is open to exterior of the wheel assembly 302, the intrusion of dirt is less likely to cause friction or otherwise inhibit relative movement that may occur between the bearing cage 402 and the wheel support 338.

Turning now to the engagement between the rolling elements 406 and the upper bearing surface 504, reference is made to FIGS. 7 and 8. As can best be seen in the close-up illustration of FIG. 8, the angled wall portion 352 portion of the housing 336 has a variable thickness such that the upper bearing surface 504 is curved slightly outward and toward the rolling element 406. The outward curvature of the upper bearing surface 504 reaches a maximum at a point or apex that is positioned between the upper and lower ends of the rolling element 406. In one embodiment, the apex of the upper bearing surface 504 substantially corresponds to a midway point along a length of the rolling element 406. Thus, the upper bearing surface 504 curves slightly away from the ends the rolling element 406 where the rolling element 406 could contain a corner or other sharp angle. By curving the upper bearing surface 504 in this way, the force applied to the rolling element 406 is substantially near the midway point along the length of the rolling element 406 and not an end of the rolling element 406 where the force would otherwise be concentrated due to the presence of sharp angles. Concentrating the force between the upper and lower ends of the rolling element 406 is advantageous because the force is distributed more evenly through the body of the rolling element 406 than would be the case if the force was concentrated at an end of the rolling element 406. Thus, energy is transferred more efficiently between the upper bearing surface 504 and the rolling element 406 in this configuration. Here, the rolling element 406 may deflect so that the rolling element 406 still contacts the upper bearing surface 504 along the entire length of the rolling element 406, resulting in better distribution of the force along the rolling element 406 when deformed. In alternative configurations both the upper 504 and lower 508 bearing surfaces are curved, or the lower bearing surface 508 is curved but the upper bearing surface 504 is not.

The example wheel assembly 302 illustrated in FIGS. 7-9 also contains an alternative configuration for the connection between the housing 336 and the wheel support 338. As can be seen in the cross-sectional view of FIG. 9, the housing 336 includes an upper collar 354 having an inner surface that defines an upper bore 353 portion of the housing 336. The inner surface of the upper collar 354 acts as an axle bearing surface for an upper portion of wheel support 338 that is received in the upper bore 353 so as to form a rotatable connection between the housing 336 and the wheel support 338. A rivet 356 disposed through the central cavity of the wheel support 338 may secure the connection between the housing 336 and the wheel support 338. The configuration illustrated in FIGS. 7-9 may also contain grease grooves 528 disposed on the outer surface of the upper portion of the wheel support 338. The grease groves 528 provide spacing that enables a lubricating grease to be present between the upper collar 354 and the upper portion of wheel support 338 so as to provide a smoother rotatable connection. The grease groves 528 may have a substantially vertical orientation and may extend from a top surface of the wheel support 338 down the length of the upper portion of the wheel support 338 for a distance. The grease grooves 528 can extend for any distance along the length of the upper portion of the wheel support 338, but will generally not extend into the frustoconical bearing section. The grease grooves 528 may be further oriented in spaced angular intervals around the circumference of the upper portion of the wheel support 338.

As shown in FIG. 9, grease grooves 528 may be omitted in a forward section 532 of the upper portion of the wheel support 338 that faces the highest load. As described above, the wheel support 338 includes struts 364 having apertures 372 that receive a central axle 374 that supports the wheel 340. The forward section 532 is centered in the plane that lies midway between the struts 364. More specifically, the forward section 532 may be a section of the upper portion of the wheel support 338 having an angle that is bisected or otherwise divided by the plane that lies midway between the struts 364. In one embodiment, the forward section is an approximately 30 degree section. The struts 364 are angled such that the apertures 372 that receive the central axle 374 are off-center with respect to the pivot axle 356. The forward section 532 is located on an opposite side of the pivot axle 356 from that of the apertures 372. As wheel assembly 302 moves, the wheel support 338 will tend to rotate such that the wheel 340 aligns with the direction of travel, with the wheel 340 trailing the forward section 532. Thus, the location of the highest loading will be between the forward section 532 and that portion of the upper bore 353 that is in contact with the forward section 532. In order to achieve greater efficiency of mechanical energy transfer, it may be desirable to maximize the amount of wheel support 338 surface area that contacts the surface area of the upper bore 353. Thus, it may be advantageous to omit the grease grooves 528 in the forward section 532 of the upper portion of the wheel support 338.

The example wheel assembly 302 illustrated in FIGS. 7-9 provides a number of other features that provide various advantages. First, the wheel assembly 302 includes a number of cut-outs 536 or void spaces that reduce material usage. Reducing the amount of material used has the advantage of reducing the pre-unit cost of producing the product. Additionally, in some embodiments, a 7 mm axle is used so as to be able to use an aluminum axle. The housing 336 may also contain a rounded section 544 that engages the underside 548 of a washer 540 that is located between the housing 336 and the wheel support 338. The washer 540 has an outer edge which is a circumferential edge located adjacent to the central axis at distance corresponding to the diameter of the washer 540. In some manufacturing processes, the washer 540 is stamped and as a result the outer edge of washer 540 may have a sharp edge pointing downward from the underside 548 of the washer 540. The rounded section 544 is shaped so as to avoid contact between the outer edge of the washer 540 and the housing 336 so as to prevent contact between the sharp outer edge of the washer 540 and the housing 336 which could otherwise cause unwanted friction or cutting into the housing 336.

The wheel housing, friction reduction member, and/or the wheel support of the wheel assemblies described herein may be formed using plastic materials including, but not limited to, polyethylene (PE), polypropylene (PP), polyvinyl chloride (PVC), acrylonitrile butadiene styrene (ABS), poly carbonate (PC), polyamide (PA), polybutylene terephthalate (PBT), and so on.

It should be noted that all directional and/or dimensional references (e.g., upper, lower, upward, downward, left, right, leftward, rightward, top, bottom, above, below, front, back, rear, forward, backward, rearward, inner, outer, inward, outward, vertical, horizontal, clockwise, counterclockwise, length, width, height, depth, and relative orientation) are only used for identification purposes to aid the reader's understanding of the implementations of the disclosed invention(s), and do not create limitations, particularly as to the position, orientation, use relative size or geometry of the invention(s) unless specifically set forth in the claims.

Connection references (e.g., attached, coupled, connected, joined, and the like) are to be construed broadly and may include intermediate members between a connection of elements and relative movement between elements. As such, connection references do not necessarily infer that two elements are directly connected and in a fixed relation to each other.

In some instances, components are described with reference to "ends" having a particular characteristic and/or being connected with another part. However, those skilled in the art will recognize that the disclosed invention(s) is not limited to components that terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made that are within the scope of the appended claims.

The invention claimed is:

1. A luggage case comprising:
a plurality of panels defining a storage volume; and
a luggage wheel assembly comprising:
  a housing coupled to at least one panel of the luggage case;
  a wheel support rotatably coupled to the housing and having a first axis of rotation;
  a wheel member rotatably coupled to the wheel support and having a second axis of rotation;
  the housing including:
    a base defining a bottom side of the housing; and
    a wall defining an upper side and an underside;
  the wheel support including a wall defining an upper side and an underside; and
  at least one of the underside of the wall of the housing or the upper side of the wall of the wheel support defining in part a partially conical shape having an apex, wherein the apex of the partially conical shape is positioned above the bottom side of the housing.

2. The luggage case of claim 1, wherein the partially conical shape of the housing or the wheel support is recessed from an exterior surface of the luggage case.

3. The luggage case of claim 1, wherein the underside of the wall of the wheel support defines in part a concave cavity opening downwardly.

4. The luggage case of claim 1, wherein the housing comprises at least two sides each coupled to a different panel of the luggage case, and the at least two sides of the housing comprises the bottom side coupled to a bottom panel of the luggage case and two vertical sides respectively coupled to an adjacent major face panel and an adjacent side panel of the luggage case.

5. The luggage case of claim 1, further comprising a friction reduction member positioned between the housing and the wheel support.

6. The luggage case of claim 5, wherein the underside of the wall of the housing forms a first bearing surface movably engaging the friction reduction member, and the upper side of the wall of the wheel support forms a second bearing surface movably engaging the friction reduction member.

7. The luggage case of claim 6, wherein the first and second bearing surfaces are substantially parallel to each other or oriented at a same angle relative to the first axis of rotation of the wheel support.

8. The luggage case of claim 6, wherein at least one of the first bearing surface or the second bearing surface is oriented at an angle selected from between 30 to 50 degrees, or between 35 to 45 degrees, or 40 degrees, with respect to the first axis of rotation of the wheel support.

9. The luggage case of claim 6, wherein the wheel support further comprises a spigot having an axis parallel to the first axis and extending from an upper rim of the second bearing surface, the spigot received in a bore defined in the housing and located centrally with respect to the first bearing surface.

10. The luggage case of claim 5, wherein the friction reduction member comprises a plurality of rollers.

11. The luggage case of claim 10, wherein each of the plurality of rollers is substantially cylindrical or conical.

12. The luggage case of claim 10, wherein the friction reduction member further comprises a cage for receiving the rollers, the cage in supportive contact with the wheel support at an upper end of the cage.

13. The luggage case of claim 12, wherein the upper end of the cage includes a collar defining an annular shoulder adapted to engage a raised ridge portion of an annular ring disposed on the wheel support.

14. The luggage case of claim 6, wherein the friction reduction member comprises a plurality of rollers, and wherein the first bearing surface is curved to form an apex that engages the plurality of rollers between opposing ends of each roller.

15. The luggage case of claim 14, wherein the apex of the first bearing surface substantially corresponds to a midway point along a length of each roller.

16. The luggage case of claim 1, further comprising a securing assembly restricting relative movement between the wheel support and the housing in a direction parallel to the first axis of rotation of the wheel support.

17. The luggage case of claim 1, wherein the wheel support comprises a pair of struts each formed with at least a contoured inner surface.

18. The luggage case of claim 17, wherein the pair of struts each are formed with a contoured outer surface, the contoured inner surface of each of the pair of struts and the corresponding contoured outer surface are formed with substantially the same curvature.

19. The luggage case of claim 1, further comprising a plurality of grooves disposed about the circumference of a head portion of the wheel support, the grooves oriented in spaced angular intervals excluding a forward section defined by an angle that is divided by a direction of travel of the luggage wheel assembly, the wheel member trailing the forward section when the luggage wheel assembly is in motion.

\* \* \* \* \*